United States Patent
Stauss et al.

(10) Patent No.: US 12,493,132 B2
(45) Date of Patent: Dec. 9, 2025

(54) SYSTEM AND METHOD FOR DYNAMIC GAIN SWITCHING IN DETECTING OBJECTS BEHIND AN OPAQUE SURFACE

(71) Applicant: Zircon Corporation, Campbell, CA (US)

(72) Inventors: John Robert Stauss, Los Gatos, CA (US); Pablo Montero, San Jose, CA (US); Micaela Abarca Kapp, San Jose, CA (US)

(73) Assignee: Zircon Corporation, Campbell, CA (US)

( * ) Notice: Subject to any disclaimer, the term of this patent is extended or adjusted under 35 U.S.C. 154(b) by 0 days.

(21) Appl. No.: 19/095,155

(22) Filed: Mar. 31, 2025

(65) Prior Publication Data

US 2025/0306230 A1    Oct. 2, 2025

Related U.S. Application Data

(60) Provisional application No. 63/573,417, filed on Apr. 2, 2024.

(51) Int. Cl.
*G01V 3/15*    (2006.01)
*G01V 3/38*    (2006.01)

(52) U.S. Cl.
CPC . *G01V 3/15* (2013.01); *G01V 3/38* (2013.01)

(58) Field of Classification Search
CPC ............... G01V 3/15; G01V 3/38; G01V 3/08
See application file for complete search history.

(56) References Cited

U.S. PATENT DOCUMENTS

| | | | |
|---|---|---|---|
| 6,259,241 B1 * | 7/2001 | Krantz | G01V 3/15 324/67 |
| 6,989,662 B2 * | 1/2006 | Heger | G01V 13/00 324/67 |
| 11,927,714 B2 * | 3/2024 | Stauss | G01V 3/165 |
| 2004/0255477 A1 * | 12/2004 | Levine | G01C 15/004 33/286 |

(Continued)

OTHER PUBLICATIONS

International Search Report and Written Opinion dated May 20, 2025 from PCT Application No. PCT/US2025/022457, filed Apr. 1, 2025.

*Primary Examiner* — Reena Aurora
(74) *Attorney, Agent, or Firm* — Silicon Valley Patent Group LLP; Thomas C. Chan

(57) ABSTRACT

Aspects of the present invention include a system and method for dynamic gain switching in detecting one or more objects behind an opaque surface, comprising: collecting sensor data by a pair of capacitive sensors and a metal sensor of a scanner; monitoring characteristics of signal strengths detected by the pair of capacitive sensors and the metal sensor using the sensor data, including a saturation condition detected by the pair of capacitive sensors and the metal sensor; switching gain sensitivity of the pair of capacitive sensors dynamically from a first gain sensitivity mode to a second gain sensitivity mode, in response to the saturation condition being met; continue collecting sensor data by the pair of capacitive sensors using the second gain sensitivity mode; and informing a user via a user interface of the scanner, information derived from the sensor data collected about the one or more objects behind the opaque surface.

20 Claims, 12 Drawing Sheets

(56) References Cited

U.S. PATENT DOCUMENTS

2005/0194959 A1* 9/2005 Miller .................... G01V 3/088
                                                      324/67
2011/0215815 A1* 9/2011 Dorrough .............. G01N 27/22
                                                      324/663
2019/0021631 A1* 1/2019 Cohen .................... A61B 90/39

* cited by examiner

SYSTEM AND METHOD FOR DYNAMIC GAIN SWITCHING IN DETECTING OBJECTS BEHIND AN OPAQUE SURFACE

CROSS REFERENCE TO RELATED APPLICATIONS

This application claims the benefit of U.S. provisional application No. 63/573,417, "System and Method for Dynamic Gain Switching in Detecting Objects behind an Opaque Surface," filed Apr. 2, 2024, assigned to the assignee hereof. The aforementioned United States application is hereby incorporated by reference in its entirety.

FIELD

The present invention relates to the field of scanners for detecting one or more objects behind an opaque surface.

BACKGROUND

Stud finders have been commonly used in construction and home improvement industries. FIG. 1 illustrates a side view of a conventional scanner. As shown in FIG. 1, a scanner 102 may be used in a construction and home improvement environment 100. For example, scanner 102 may be configured to detect an object 101 behind an opaque surface 103. In some exemplary applications, object 101 may be a stud, an electrical wire, plastic pipe or a metal pipe. In one exemplary embodiment, the stud may be a wooden stud, vertical wooden element, bridging block, fire block, or any other block, joists, rafters, headers, posts, columns, let brace, or any similar wooden element used for integrity, fabrication, or maintenance of a structural element. In one exemplary embodiment, opaque surface 103 may be, for example, a wall covered with drywall, particle board, or plywood; as an example, a floor with opaque material attached to structural members; as an example, a ceiling with an opaque surface, attached to rafters; or any other opaque surface behind which objects are not visible through the surface.

In one exemplary embodiment, scanner 102 may include a housing to enclose and protect various electronic components. For example, within the housing of the scanner 102, it may include a printed circuit board (PCB) 104, which can be configured to hold the various electronic components, such as one or more capacitive sensors 108, one or more metal sensors 109, one or more current sensors (not shown), a controller/processor and other integrated circuits (labelled as 106a and 106b). The PCB 104 may be coupled to a battery 107, which provides power to the scanner 102.

Some conventional scanners operate in a single mode, often referred to as the deep scan mode. It is intended to scan for low density objects behind an opaque surface. However, the single scan mode can produce undesirable results with high density objects or can produce misleading readings for different types of objects. Some other conventional scanners can operate in multiple modes. However, such scanners require a user's interference to switch from one mode to another mode through trial and error, which can cost valuable time and cause low customer satisfaction.

Therefore, there is a need for a scanner that can address the above drawbacks of conventional scanners in detecting one or more objects behind an opaque surface.

SUMMARY

Aspects of the present invention include a method for dynamic gain switching in detecting one or more objects behind an opaque surface. In one embodiment, a method for dynamic gain switching in detecting one or more objects behind an opaque surface, comprising: collecting, by a pair of capacitive sensors and a metal sensor of a scanner, sensor data of the one or more objects behind an opaque surface; monitoring, by one or more processors of the scanner, characteristics of signal strengths detected by the pair of capacitive sensors and the metal sensor using the sensor data, where characteristics of signal strengths include a saturation condition detected by the pair of capacitive sensors and the metal sensor; switching, by the one or more processors, gain sensitivity of the pair of capacitive sensors dynamically from a first gain sensitivity mode to a second gain sensitivity mode, in response to the saturation condition being met; continue collecting, by the pair of capacitive sensors using the second gain sensitivity mode, sensor data of the one or more objects behind the opaque surface; and informing a user, by the one or more processors via a user interface of the scanner, information derived from the sensor data collected about the one or more objects behind the opaque surface.

In another embodiment, A scanner for dynamic gain switching in detecting one or more objects behind an opaque surface, comprising: a pair of capacitive sensors, controlled by one or more processors, configured to collect sensor data of the one or more objects behind an opaque surface along a scan path of the scanner; the one or more processors are configured to monitor characteristics of signal strengths detected by the pair of capacitive sensors using the sensor data, wherein the characteristics of signal strengths include a saturation condition detected in a first capacitive sensor or in a second capacitive sensor in the pair of capacitive sensors; the one or more processors are further configured to switch gain sensitivity of the pair of capacitive sensors dynamically from a first gain sensitivity mode to a second gain sensitivity mode, in response to the saturation condition being met; the pair of sensors are further configured to continue to collect, using the second gain sensitivity mode, sensor data of the one or more objects behind the opaque surface along the scan path of the scanner; and the one or more processors are further configured to inform a user, via a user interface of the scanner, information derived from the sensor data collected about the one or more objects behind the opaque surface.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the non-limiting and non-exhaustive aspects of the following drawings. Like numbers are used throughout the disclosure.

DESCRIPTION OF EMBODIMENTS

Methods and apparatuses are provided for dynamic gain switching in detecting objects behind an opaque surface. The following descriptions are presented to enable a person skilled in the art to make and use the invention. Descriptions of specific embodiments and applications are provided only as examples. Various modifications and combinations of the examples described herein may be readily apparent to those skilled in the art, and the general principles defined herein may be applied to other examples and applications without departing from the scope of the invention. Thus, the present invention is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Some portions of the detailed description that follow are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

The drawings are presented for illustration purposes, and they are not drawn to scale. In some examples, rectangles, circles or other shapes are used to illustrate shapes of objects and their respective estimated shapes of the objects. In real world applications, the shapes of objects and their respective estimated shapes of the objects may be irregular and may be in any shapes or forms. Note that in the following figures, for each object, a section of the object, not the entire object, is shown. This also applies to the respective estimated shape of each object.

Figure 2:
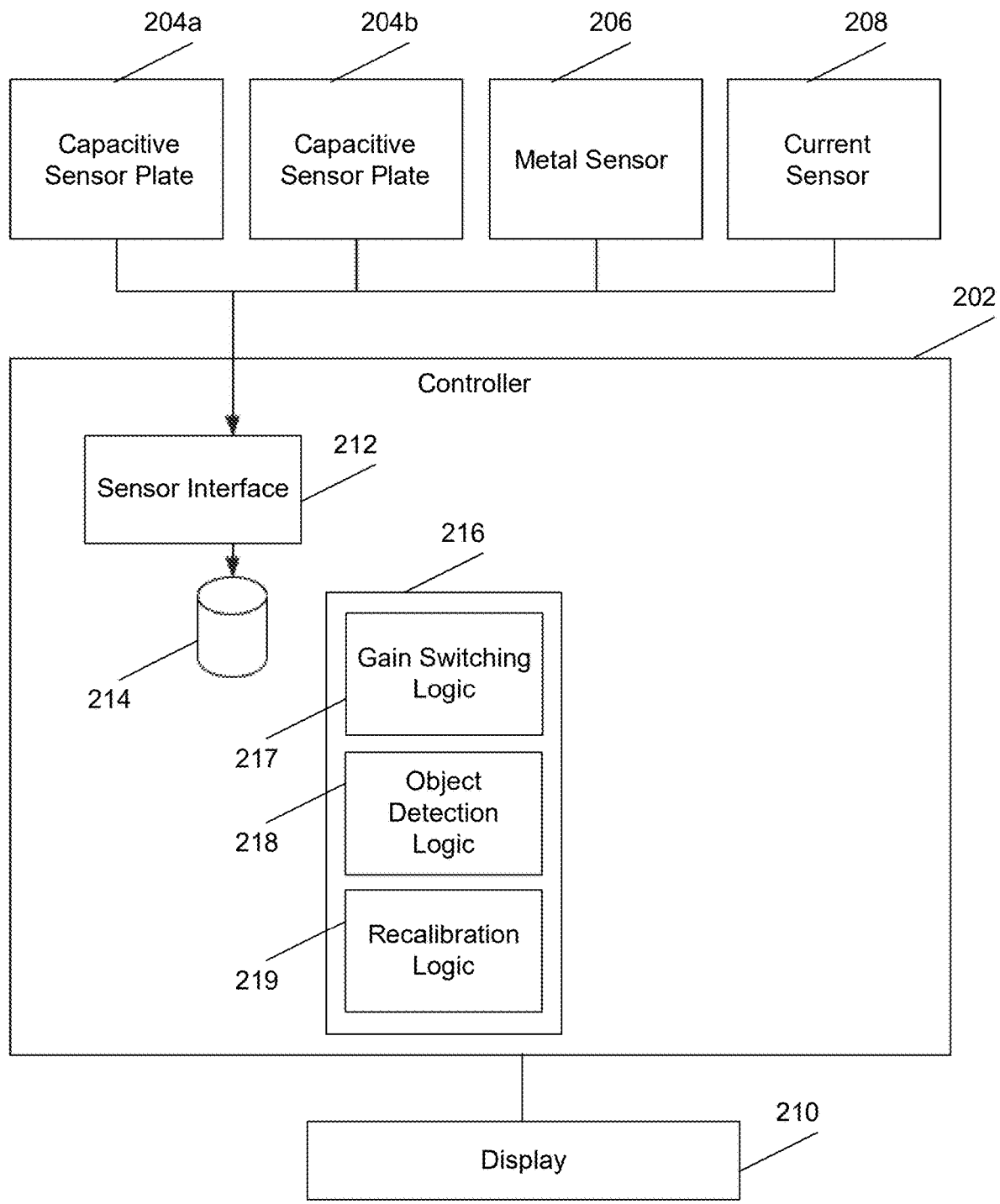
FIG. 2 illustrates a block diagram of an exemplary embodiment of a system for dynamic gain switching in detecting objects behind an opaque surface according to aspects of the present invention.

FIG. 2 illustrates a block diagram of an exemplary embodiment of a system for dynamic gain switching in detecting objects behind an opaque surface according to aspects of the present invention. In the exemplary system shown in FIG. 2, a controller 202 may be configured to process sensor data collected by sensors of the scanner, namely sensor data collected by capacitive sensor plate 204a, capacitive sensor plate 204b, metal sensors 206, and current/AC sensors 208, or other types of sensors. In some implementations, the metal sensors 206 and/or the current sensors 208 may be optional in the system. In some other implementations, the system may optionally or additionally include a humidity sensor configured to measure water content in the surrounding air, a temperature sensor configured to measure temperature of surrounding air or surface, and a moisture sensor configured to measure water content in a substance. The controller can further be configured to determine information about the detected objects behind the opaque surface based on the sensor data collected by capacitive sensors 204a and 204b, metal sensors 206, and/or current sensors 208 in parallel. The controller 202 may include a sensor interface 212, sensor data storage 214, and an object handler 216. The object handler may include gain switching logic 217, object detection logic 218, and recalibration logic 219. The controller 202 may further include one or more processors, which may be configured to implement the gain switching logic 217, object detection logic 218, and recalibration logic 219. A display 210 is configured to provide information about the detected objects to a user. In some other implementations, each type of the sensors, such as the capacitive sensors 204a and 204b, the metal sensor 206, and the current sensor 208, can be turned on individually or in certain desired combination while the other types of sensors are turned off so that certain types of objects behind the opaque surface may be highlighted by such scans. The one or more processors can process the sensor data to differentiate the different objects detected, and select a certain particular object and disclose to the user its corresponding region based on the differences in density of the different objects detected.

Figure 1:
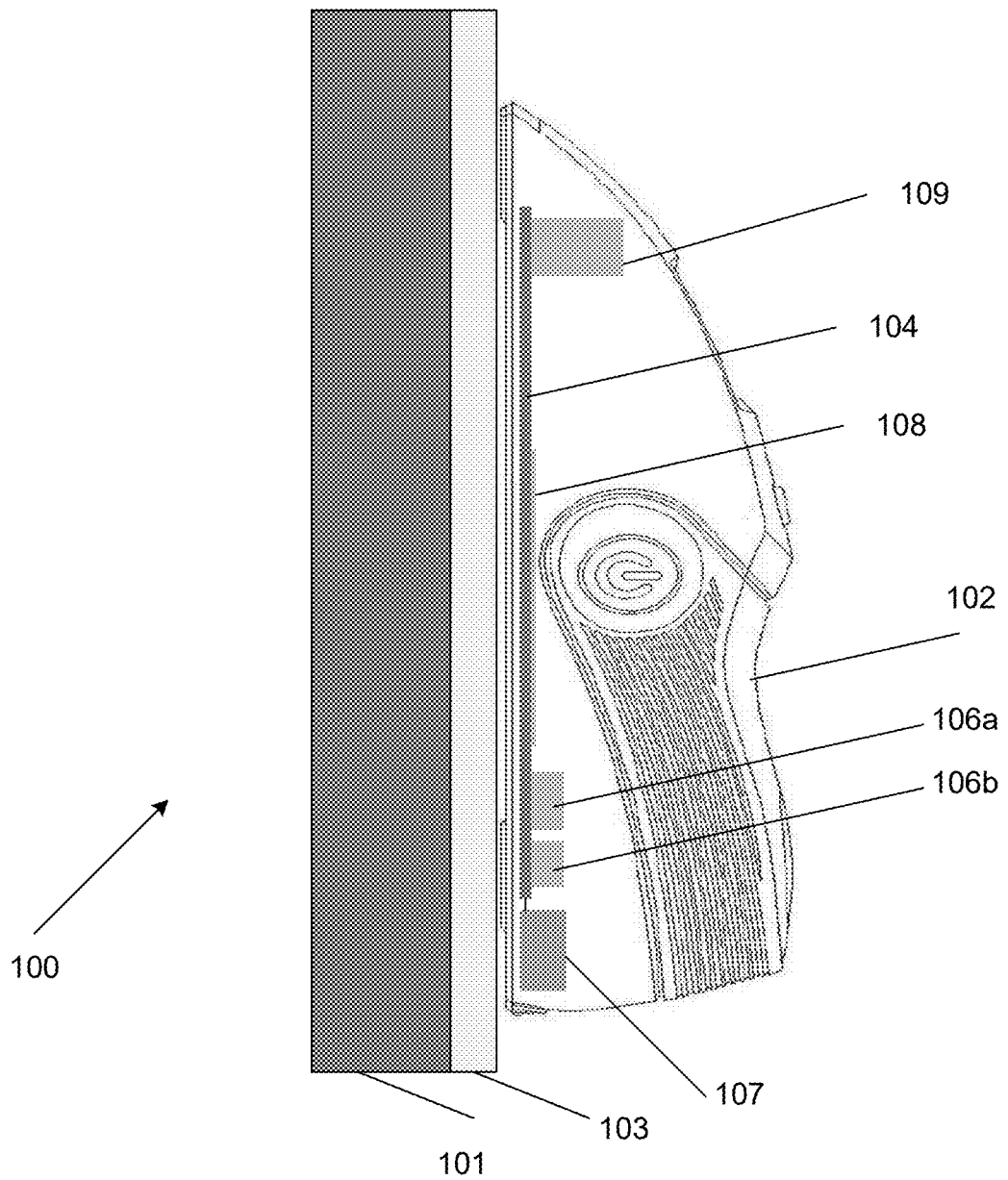
FIG. 1 illustrates a side view of a conventional scanner.
Figure 4A:
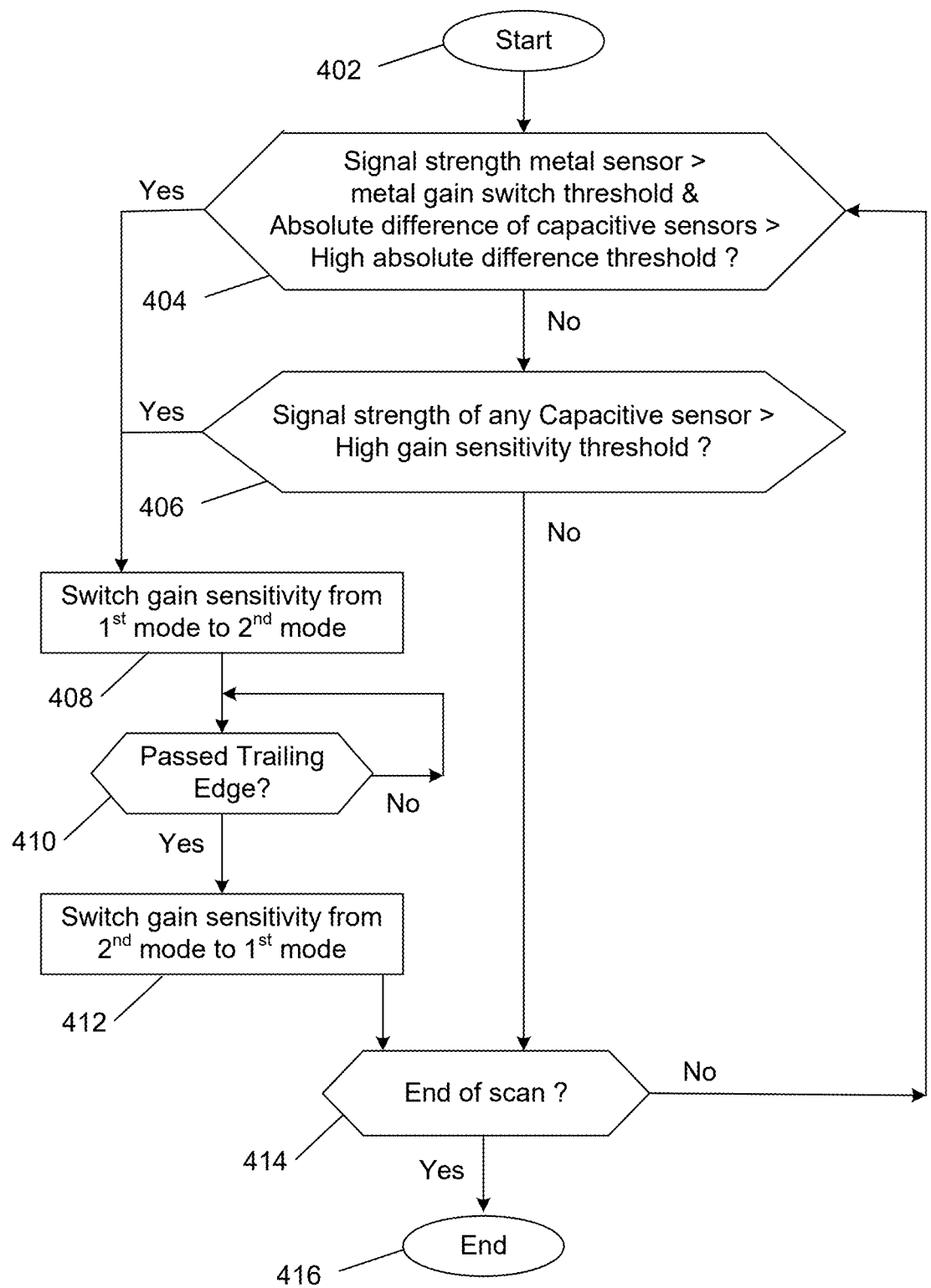
FIG. 4A illustrates another exemplary flowchart for implementing the gain switching logic of FIG. 2 according to aspects of the present invention.
Figure 4B:
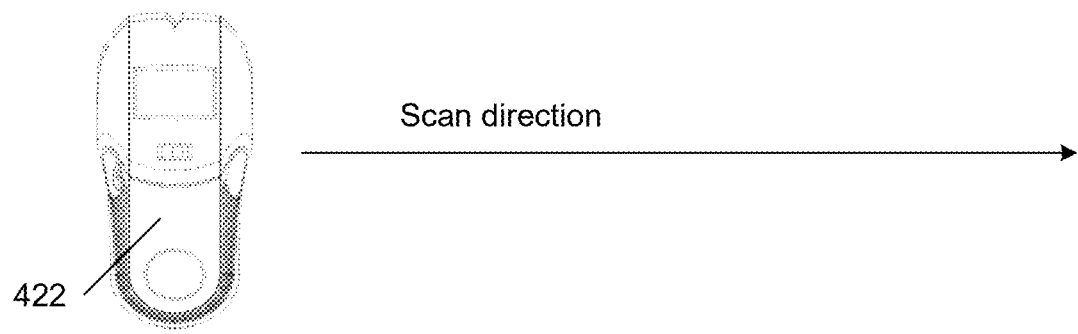
FIG. 4B illustrates an example of dynamic gain switching using FIG. 4A flowchart according to aspects of the present invention.
Figure 4B:
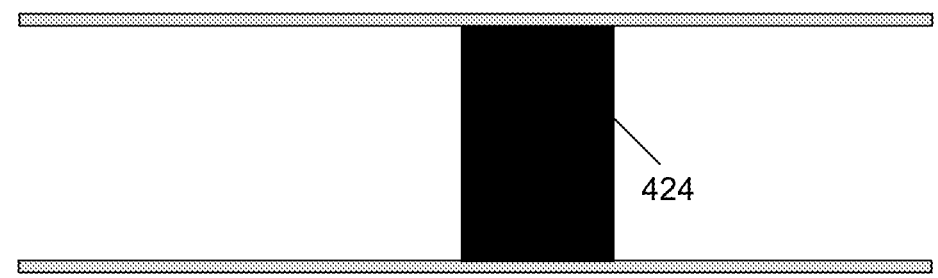
Figure 4B:
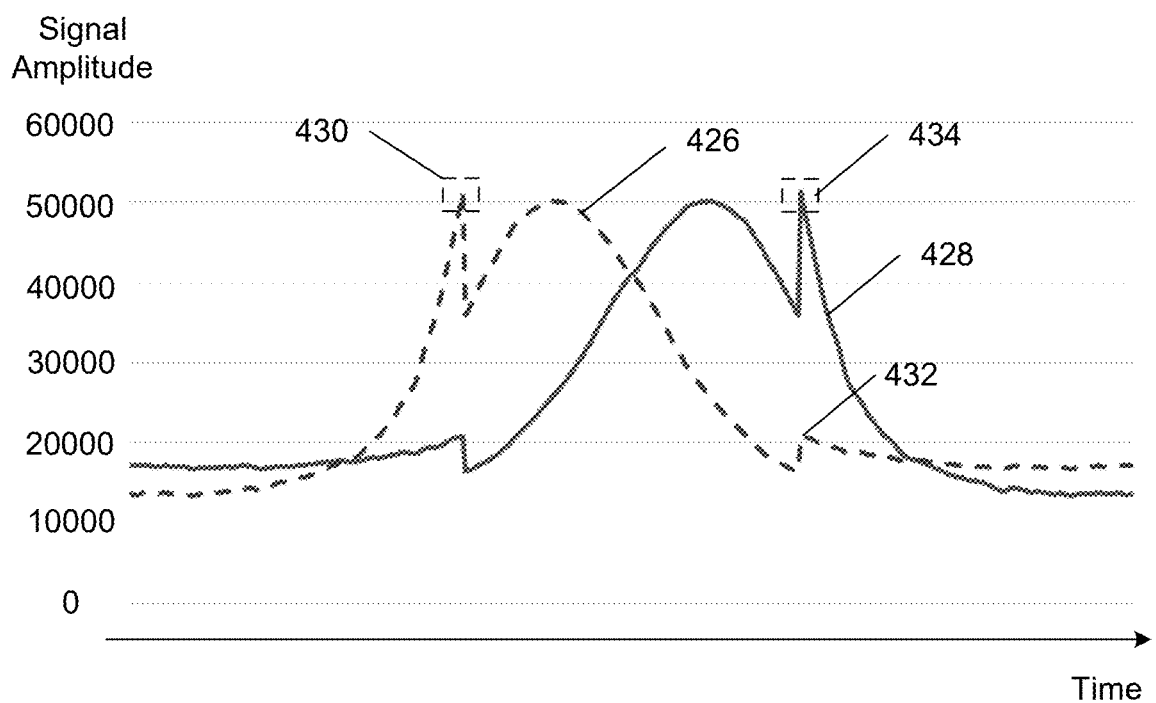
Figure 4C:
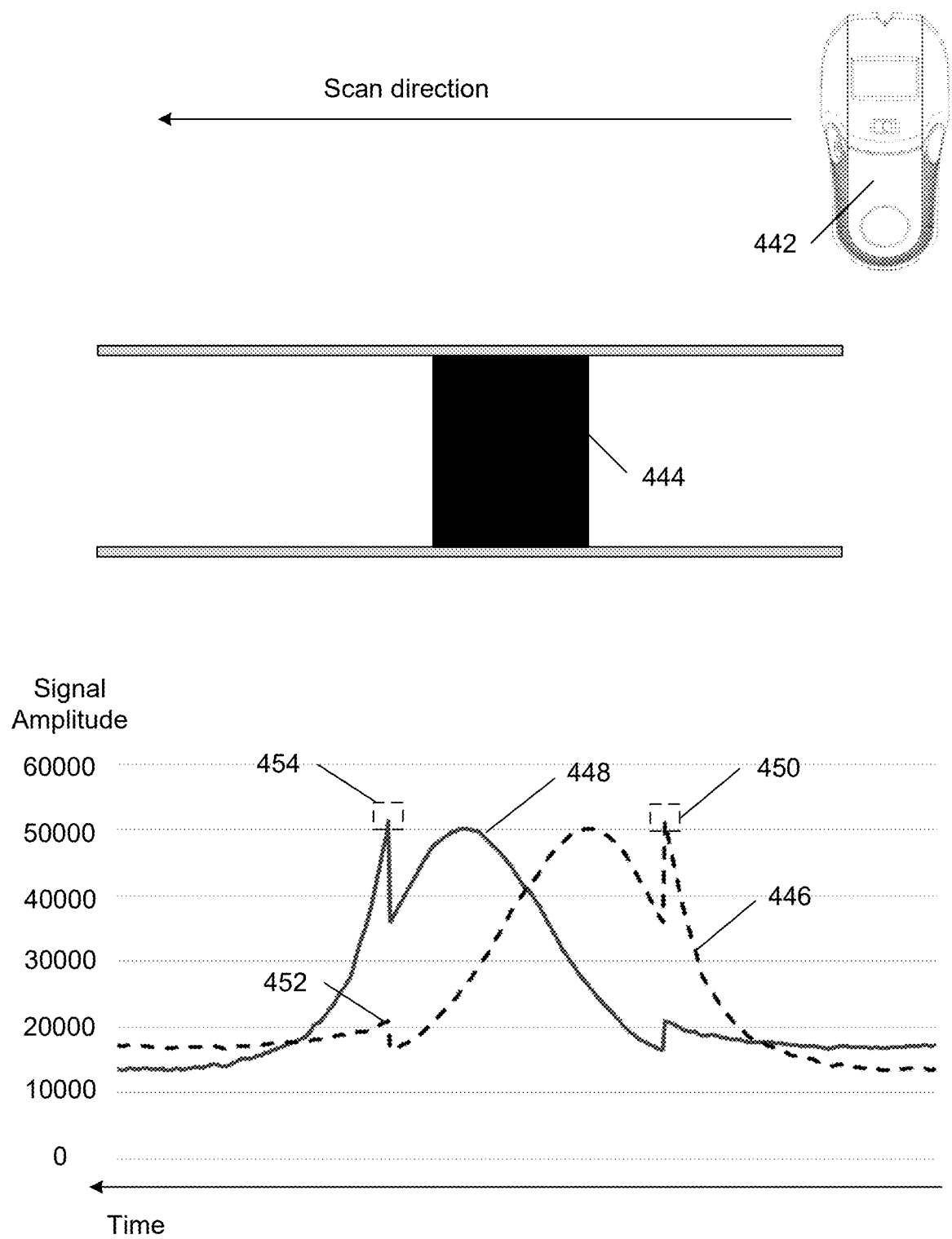
FIG. 4C illustrates another example of dynamic gain switching using FIG. 4A flowchart according to aspects of the present invention.

According to aspects of the disclosure, the functional blocks described in the system of FIG. 2 may be implemented in an integrated device such as scanner 100 of FIG. 1 and scanner 202 of FIG. 4A-4C. In other implementations, the capacitive sensors 204a and 204b, metal sensors 206, and current sensor 208 may reside in one device, while the controller 202 and the display 210 may reside in another device. For example, a scanner device may include the sensors, and the sensor data collected by the scanner device may be wirelessly communicated to a second device. The second device, for example a smartphone, a tablet, or a laptop, may include the controller 202 and the display 210. In yet other implementations, the controller 202, the capacitive sensors 204a and 204b, metal sensors 206, and current sensor 208, may reside in one device, while the display 210 may reside in another device. For example, a scanner device may include the controller 202 and the sensors, and the sensor data collected by the scanner device may be wirelessly communicated to a second device. The second device, for example a monitor, may be configured to receive and display the sensor data.

According to aspects of the present disclosure, examples of capacitive sensors and methods of operating the same are described in U.S. Pat. No. 5,619,128, entitled "STUD SENSOR WITH OVER-STUD MISCALIBRATION VIA CIRCUIT WHICH STORES AN INITIAL CALIBRATION DENSITY, COMPARES THAT TO A CURRENT TEST DENSITY AND OUTPUTS RESULT VIA INDICATOR," which is incorporated herein in its entirety by reference. Examples of metal sensors and methods of operating the same are described in U.S. Pat. No. 7,812,722, entitled "DUAL ORIENTATION METAL SCANNER," which is incorporated herein in its entirety by reference. Examples of current sensors and methods of operating the same are described in U.S. Pat. No. 6,933,712, entitled "ELECTRICAL CIRCUIT TRACING AND IDENTIFYING APPARATUS AND METHOD," which is incorporated herein in its entirety by reference. In one exemplary embodiment, current sensors may be able to detect electromagnetic fields generated by an alternating current. In another exemplary embodiment, current sensors may be able to detect the electromagnetic fields generated by a direct current.

Figure 3A:
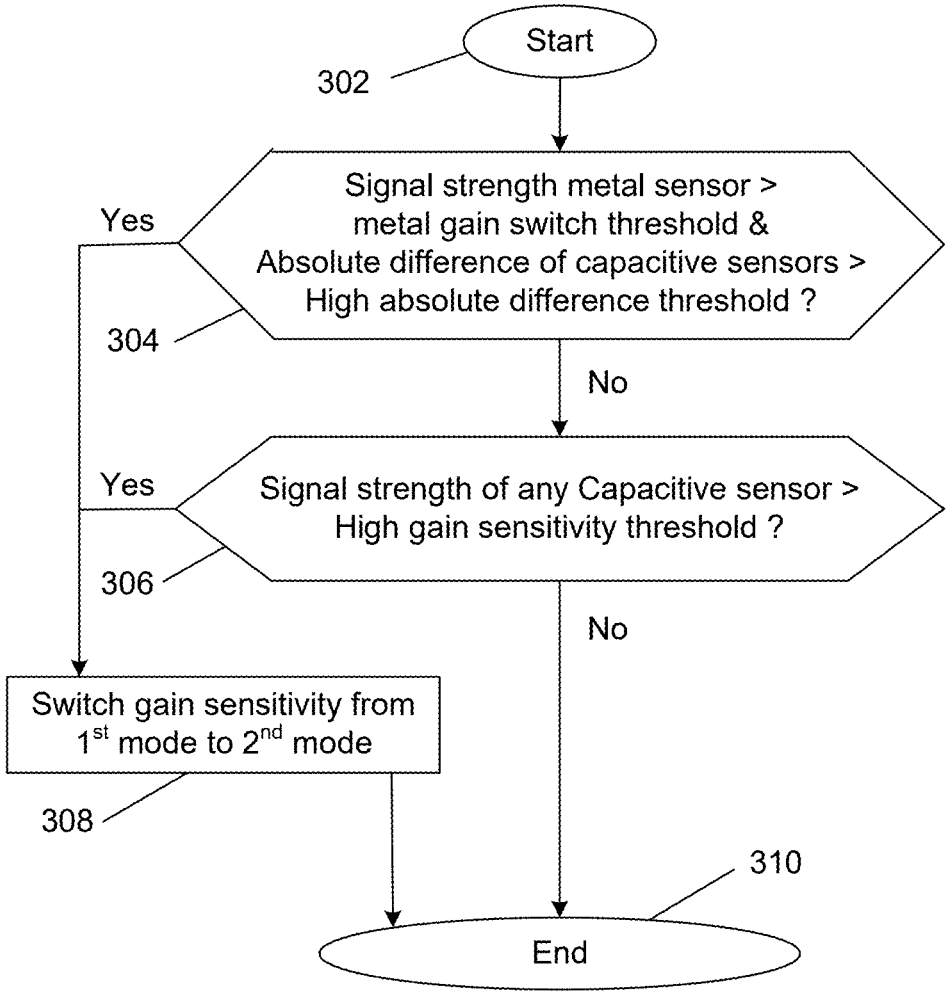
FIG. 3A illustrates an exemplary flowchart for implementing the gain switching logic of FIG. 2 according to aspects of the present invention.

FIG. 3A illustrates an exemplary flowchart for implementing the gain switching logic of FIG. 2 according to aspects of the present invention. As shown in FIG. 3, the flowchart starts in block 302, a scanner can be powered on and calibrated in a high gain mode with a corresponding set of parameters for operating the scanner in the high gain mode. The scanner can stay in the high gain mode until there may be a risk of saturation of the capacitive sensors.

In block 304, a first determination is made on whether the amplitude of a metal sensor of the scanner is greater than a predetermined metal gain switch threshold and whether the absolute difference between the amplitude of signal strength detected at the leading capacitive sensor plate and the trailing capacitive sensor plate is greater than a predetermined high absolute difference threshold. If the above conditions are met (304_Yes), the flowchart moves to block 308. Else if the above conditions are not met (304_No), the flowchart moves to block 306. According to aspects of the present disclosure, the predetermined metal gain switch threshold may be determined using empirical data through experimentation. Similarly, the predetermined high absolute difference threshold may be determined using empirical data through experimentation.

In block 306, a second determination is made on whether either the leading capacitive sensor plate or the trailing capacitive sensor plate has detected an amplitude of signal strength greater than a predetermined high gain sensitivity threshold. If this condition is met (306_Yes), the flowchart moves to block 308. Else if the above condition is not met (306_No), the flowchart moves to block 310. The predetermined high gain sensitivity threshold may be determined using empirical data through experimentation.

If plate saturation is detected, the scanner can be dynamically switched to a lower gain mode. In block 308, the flowchart performs dynamic gain switching from a high gain mode to a low gain mode. The scanner is then calibrated to a set of parameters for operating the scanner in the low gain mode. The scanner can stay in the low gain mode until powered down OR the device is recalibrated. The flowchart ends in block 310.

Figure 3B:
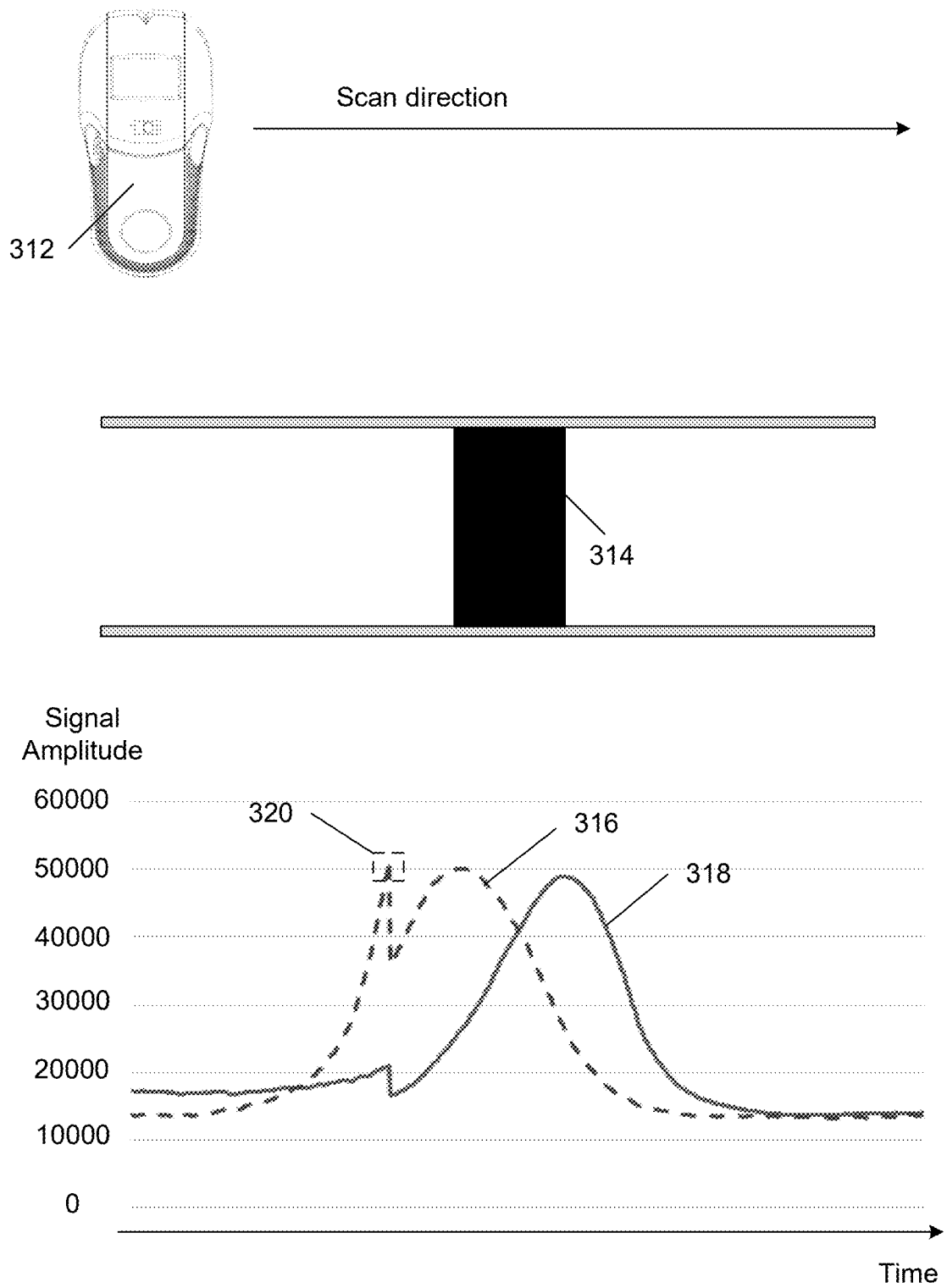
FIG. 3B illustrates an example of dynamic gain switching using FIG. 3A flowchart according to aspects of the present invention.

FIG. 3B illustrates an example of dynamic gain switching using FIG. 3A flowchart according to aspects of the present invention. In the example shown in FIG. 3B, scanner 312 scans from left to right. The horizontal axis represents time and the vertical axis represents signal amplitude. An object behind an opaque surface (visible here for illustration purposes) may be a metal stud 314. Curve 316 indicates the signal strength detected by the leading capacitive sensor plate and curve 318 indicates the signal strength detected by the trailing capacitive sensor plate. In this example, the signal strength detected by the leading capacitive sensor plate saturates at an amplitude of approximately 50,000, a region labelled as 320. As a result, the scanner switches its gain sensitivity from a high gain mode to a low gain mode dynamically, after the saturation condition is detected at the leading capacitive sensor plate. The pair of capacitive sensors are calibrated to operate in low gain mode. According to aspects of the present disclosure, calibrations of the capacitive sensors are provided below in association with FIG. 6B, FIG. 6C and their corresponding descriptions.

FIG. 4A illustrates another exemplary flowchart for implementing the gain switching logic of FIG. 2 according to aspects of the present invention. In the example shown in FIG. 4A, the flowchart starts in block 402, a scanner can be powered on and calibrated in a first gain sensitivity mode (for example a high gain mode) with a corresponding set of parameters for operating the scanner in the first gain sensitivity mode. The scanner can stay in the first gain sensitivity mode until there may be a risk of saturation of the capacitive sensors.

In block 404, a first determination is made on whether the amplitude of a metal sensor of the scanner is greater than a predetermined metal gain switch threshold and whether the absolute difference between the amplitude of signal strength detected at the leading capacitive sensor plate and trailing capacitive sensor plate is greater than a predetermined high absolute difference threshold. If the above conditions are met (404_Yes), the flowchart moves to block 308. Else if the conditions in block 404 are not met (404_No), the flowchart moves to block 406. According to aspects of the present disclosure, the predetermined metal gain switch threshold may be determined using empirical data through experimentation. Similarly, the predetermined high absolute difference threshold may be determined using empirical data through experimentation.

In block 406, a second determination is made on whether either the leading capacitive sensor plate or the trailing capacitive sensor plate has detected an amplitude of signal strength greater than a predetermined high gain sensitivity threshold. If this condition is met (406_Yes), the flowchart moves to block 408. Else if the condition in block 406 is not met (406_No), the flowchart moves to block 414. The predetermined high gain sensitivity threshold may be determined using empirical data through experimentation.

If saturation conditions in block 404 or block 406 are met, the scanner can be dynamically switched to a second gain sensitivity mode (for example a lower gain mode). In block 408, the flowchart performs dynamic gain switching from a first gain sensitivity mode to a second gain sensitivity mode (for example from a high gain mode to a low gain mode). The scanner is then calibrated to a set of parameters for operating the scanner in the second gain sensitivity mode. The scanner continues to scan objects behind the opaque surface using the second gain sensitivity mode. According to aspects of the present disclosure, calibrations of the capacitive sensors are provided below in association with FIG. 6B, FIG. 6C and their corresponding descriptions.

In block 410, a third determination is made on whether the scanner has passed a trailing edge of the object that caused gain switching. If the scanner has passed the trailing edge of the object that caused gain switching (410_Yes), the flowchart moves to block 412. Else if the scanner has not passed the trailing edge of the object that caused gain switching (410_Not), the flowchart continues to stay in block 410. In some embodiments, the trailing edge of the object that caused gain switching of the scanner is passed when the signal strength detected by the first capacitive sensor decreases and the signal strength detected by the second capacitive sensor decreases, and the signal strength of the first capacitive sensor or the signal strength of the second capacitive sensor falls below a predetermined low signal threshold.

In block 412, after scanning the object that caused dynamic gain switching of the scanner from the first gain sensitivity mode to the second gain sensitivity mode, the scanner automatically switches from the second gain sensitivity mode back to the first gain sensitivity mode. The pair of capacitive sensors may be recalibrated to operate in the first gain sensitivity mode. According to aspects of the present disclosure, calibrations of the capacitive sensors are provided below in association with FIG. 6C and its corresponding descriptions. Then, the flowchart moves to block 414.

In block 414, a fourth determination is made on whether the scan operation has been completed. If the scan operation has been completed (414_Yes), the flowchart moves to block 416. Else if the scan operation has not been completed (414_No), the flowchart moves to block 404. The flowchart ends in block 416.

FIG. 4B illustrates an example of dynamic gain switching using FIG. 4A flowchart according to aspects of the present invention. As shown in FIG. 4B, scanner 422 scans from left to right. The horizontal axis represents time, and the vertical axis represents signal amplitude. An object behind an opaque surface (visible here for illustration purposes) may be a metal stud 424. Curve 426 indicates the signal strength detected by the leading capacitive sensor plate and curve 428 indicates the signal strength detected by the trailing capacitive sensor plate. In this example, the signal strength detected by the leading capacitive sensor plate saturates at an amplitude of approximately 50,000, a region labelled as 430. As a result, the scanner switches its gain sensitivity from a first gain sensitivity mode to a second gain sensitivity mode (for example from a high gain mode to a low gain mode) dynamically, after the saturation condition is detected at the leading capacitive sensor plate.

According to aspects of the present disclosure, the saturation condition may include signal strength detected by the metal sensor increases, and the signal strength detected by the metal sensor is larger than a predetermined metal gain switch threshold as well as an absolute difference of signal strength detected by a first capacitive sensor and by a second capacitive sensor in the pair of capacitive sensors is larger than a predetermined high absolute difference threshold. The saturation condition may further include signal strength detected by the first capacitive sensor increases and by the second capacitive sensor increases; and signal strength of the first capacitive sensor or the second capacitive sensor is larger than a predetermined high gain sensitivity threshold.

After scanning the metal stud 424 that caused dynamic gain switching of the scanner from the first gain sensitivity mode to the second gain sensitivity mode, the scanner automatically switches from the second gain sensitivity mode back to the first gain sensitivity mode. This condition occurs when the signal strength detected by the leading capacitive sensor decreases and the signal strength detected by the trailing capacitive sensor decreases, and the signal strength of the leading capacitive sensor or the signal strength of the trailing capacitive sensor falls below a predetermined low signal threshold, for example as indicated by label 432. After switching back to the first gain sensitivity mode, the trailing capacitive sensor plate may detect an amplitude of approximately 50,000, a region labelled as 434. The predetermined low signal threshold may be determined using empirical data through experimentation.

FIG. 4C illustrates another example of dynamic gain switching using FIG. 4A flowchart according to aspects of the present invention. The example of FIG. 4C is similar to that of FIG. 4B. In FIG. 4C, scanner 442 scans from right to left. The horizontal axis represents time, and the vertical axis represents signal amplitude. An object behind an opaque surface (visible here for illustration purposes) may be a metal stud 444. Curve 446 indicates the signal strength detected by the leading capacitive sensor plate and curve 448 indicates the signal strength detected by the trailing capacitive sensor plate. In this example, the signal strength detected by the leading capacitive sensor plate saturates at an amplitude of approximately 50,000, a region labelled as 450. As a result, the scanner switches its gain sensitivity from a first gain sensitivity mode to a second gain sensitivity mode (for example from a high gain mode to a low gain mode) dynamically, upon detection of the saturation condition at the leading capacitive sensor plate.

According to aspects of the present disclosure, the saturation condition may include signal strength detected by the metal sensor increases, and the signal strength detected by the metal sensor is larger than a predetermined metal gain switch threshold as well as an absolute difference of signal strength detected by a first capacitive sensor and by a second capacitive sensor in the pair of capacitive sensors is larger than a predetermined high absolute difference threshold. The saturation condition may further include signal strength detected by the first capacitive sensor increases and by the second capacitive sensor increases; and signal strength of the first capacitive sensor or the second capacitive sensor is larger than a predetermined high gain sensitivity threshold.

After scanning the metal stud 444 that caused dynamic gain switching of the scanner from the first gain sensitivity mode to the second gain sensitivity mode, the scanner automatically switches from the second gain sensitivity mode back to the first gain sensitivity mode. This condition occurs when the signal strength detected by the leading capacitive sensor decreases and the signal strength detected by the trailing capacitive sensor decreases, and the signal strength of the leading capacitive sensor or the signal strength of the trailing capacitive sensor falls below a predetermined low signal threshold, for example as indicated by label 452. After switching back to the first gain sensitivity mode, the trailing capacitive sensor plate may detect an amplitude of approximately 50,000, a region labelled as 454.

Figure 5A:
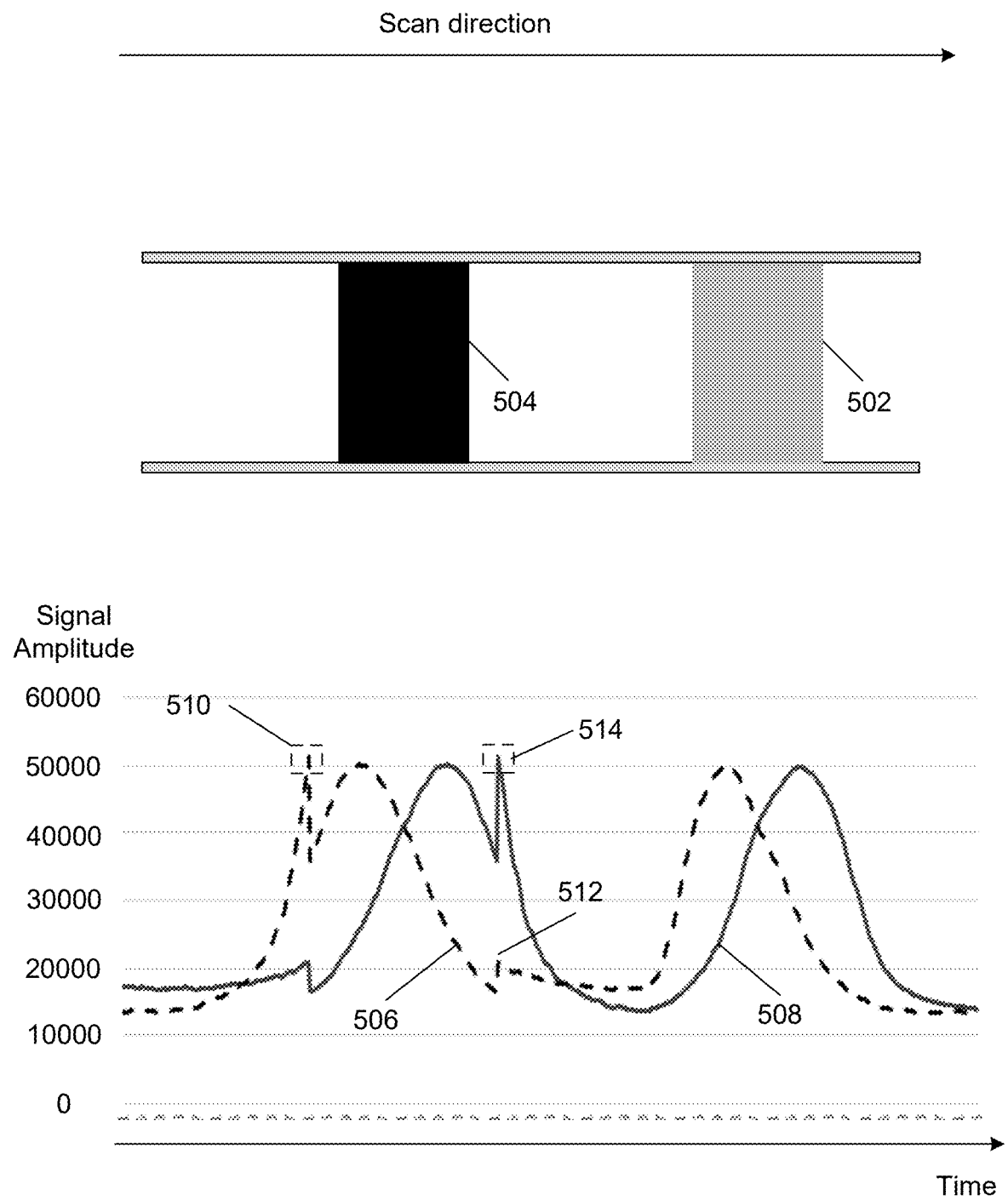
FIG. 5A illustrates an example of dynamic gain switching in detecting objects behind an opaque surface according to aspects of the present invention.

FIG. 5A illustrates an example of dynamic gain switching in detecting objects behind an opaque surface according to aspects of the present invention. As shown in FIG. 5A, the scan direction is from left to right. The horizontal axis represents time, and the vertical axis represents signal amplitude. Objects behind an opaque surface (visible here for illustration purposes) may be a metal stud 504 and PVC pipe 502, for example. Curve 506 indicates the signal strength detected by the leading capacitive sensor plate and curve 508 indicates the signal strength detected by the trailing capacitive sensor plate. In this example, the signal strength detected by the leading capacitive sensor plate saturates at an amplitude of approximately 51,000, a region labelled as 510. As a result, the scanner switches its gain sensitivity from a first gain sensitivity mode to a second gain sensitivity mode (for example from a high gain mode to a low gain mode) dynamically, after the saturation condition is detected at the leading capacitive sensor plate. The scanner continues to scan the metal stud in the second gain sensitivity mode.

After scanning the metal stud 504 that caused dynamic gain switching of the scanner from the first gain sensitivity mode to the second gain sensitivity mode, the scanner automatically switches from the second gain sensitivity mode back to the first gain sensitivity mode. This condition occurs when the signal strength detected by the leading capacitive sensor decreases and the signal strength detected by the trailing capacitive sensor decreases, and the signal strength of the leading capacitive sensor or the signal strength of the trailing capacitive sensor falls below a predetermined low signal threshold, for example as indicated by label 512. After switching back to the first gain sensitivity mode, the trailing capacitive sensor plate may detect an amplitude of approximately 51,000, a region labelled as 514.

According to aspects of the present disclosure, after switching from the second gain sensitivity mode back to the first gain sensitivity mode automatically, the scanner continues to scan along its scan path and encounters a second object, for example PVC pipe 502. A PVC pipe has a lower density than a metal stud, which can be harder to detect if the capacitive sensors of the scanner are in a low sensitivity mode. However, in this example, since the scanner can automatically switch from a low sensitivity mode back to a high sensitivity mode, the quality of sensor data of the PVC pipe collected by the scanner has improved.

Figure 5B:
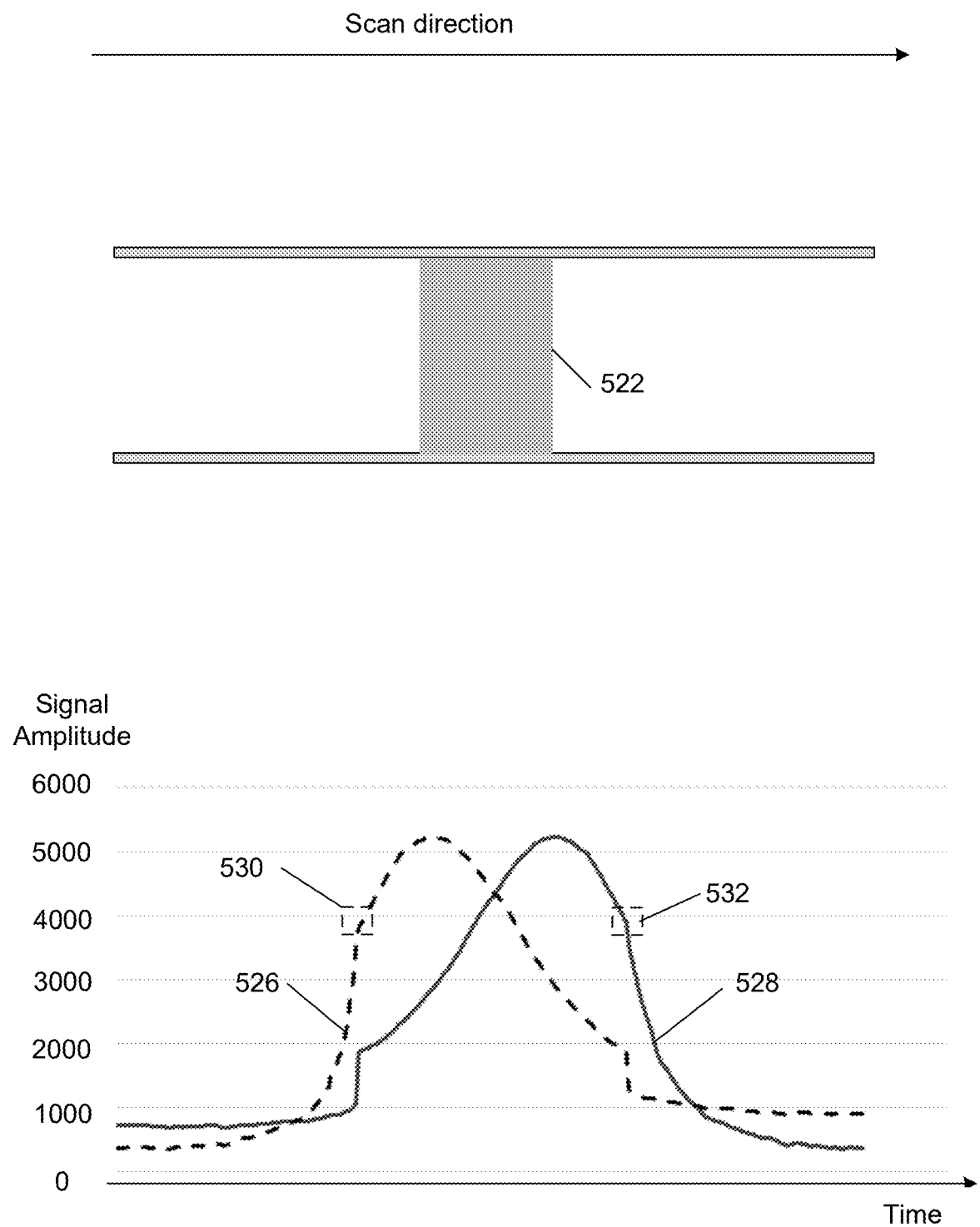
FIG. 5B illustrates another example of dynamic gain switching in detecting objects behind an opaque surface according to aspects of the present invention.

FIG. 5B illustrates another example of dynamic gain switching in detecting objects behind an opaque surface according to aspects of the present invention. As shown in FIG. 5B, the scan direction is from left to right. The horizontal axis represents time, and the vertical axis represents signal amplitude. Objects behind an opaque surface (visible here for illustration purposes) may be a PVC pipe 522, for example. Curve 526 indicates the signal strength detected by the leading capacitive sensor plate and curve 528 indicates the signal strength detected by the trailing capacitive sensor plate.

In this example, the scanner starts in a default setting of low signal gain sensitivity. As the scanner traverses the scan path, it monitors conditions that may trigger a dynamic switch of gain sensitivity from a first gain sensitivity mode to a second gain sensitivity mode (for example from a low gain mode to a high gain mode). The conditions may include: 1) signal strengths detected by both the leading capacitive sensor plate and the trailing capacitive sensor plate increase; 2) signal strength detected by a metal sensor is below a predetermined low metal signal strength threshold; and 3) signal strength of the leading capacitive sensor plate exceeds a predetermined L2H gain switch threshold, indicated by label 530, for example at a signal amplitude of 4000. If the above conditions are met, the scanner switches its gain sensitivity from a first gain sensitivity mode to a second gain sensitivity mode (for example from a low gain mode to a high gain mode) dynamically. The scanner continues to scan the PVC pipe 522 in the second gain sensitivity mode.

After scanning the PVC pipe 522, the scanner may automatically switch from the second gain sensitivity mode back to the first gain sensitivity mode (the default mode). This condition occurs when the signal strength detected by the leading capacitive sensor decreases and the signal strength detected by the trailing capacitive sensor decreases, and the signal strength of the trailing capacitive sensor falls below a predetermined H2L gain switch threshold indicated by label 532, for example at a signal amplitude of 4000. After switching back to the first gain sensitivity mode, the scanner continues to scan for other objects behind the opaque surface until the user terminates the scan operation. According to aspects of the present disclosure, the predetermined L2H gain switch threshold may be determined using empirical data through experimentation. Similarly, the predetermined H2L gain switch threshold may be determined using empirical data through experimentation.

Figure 6A:
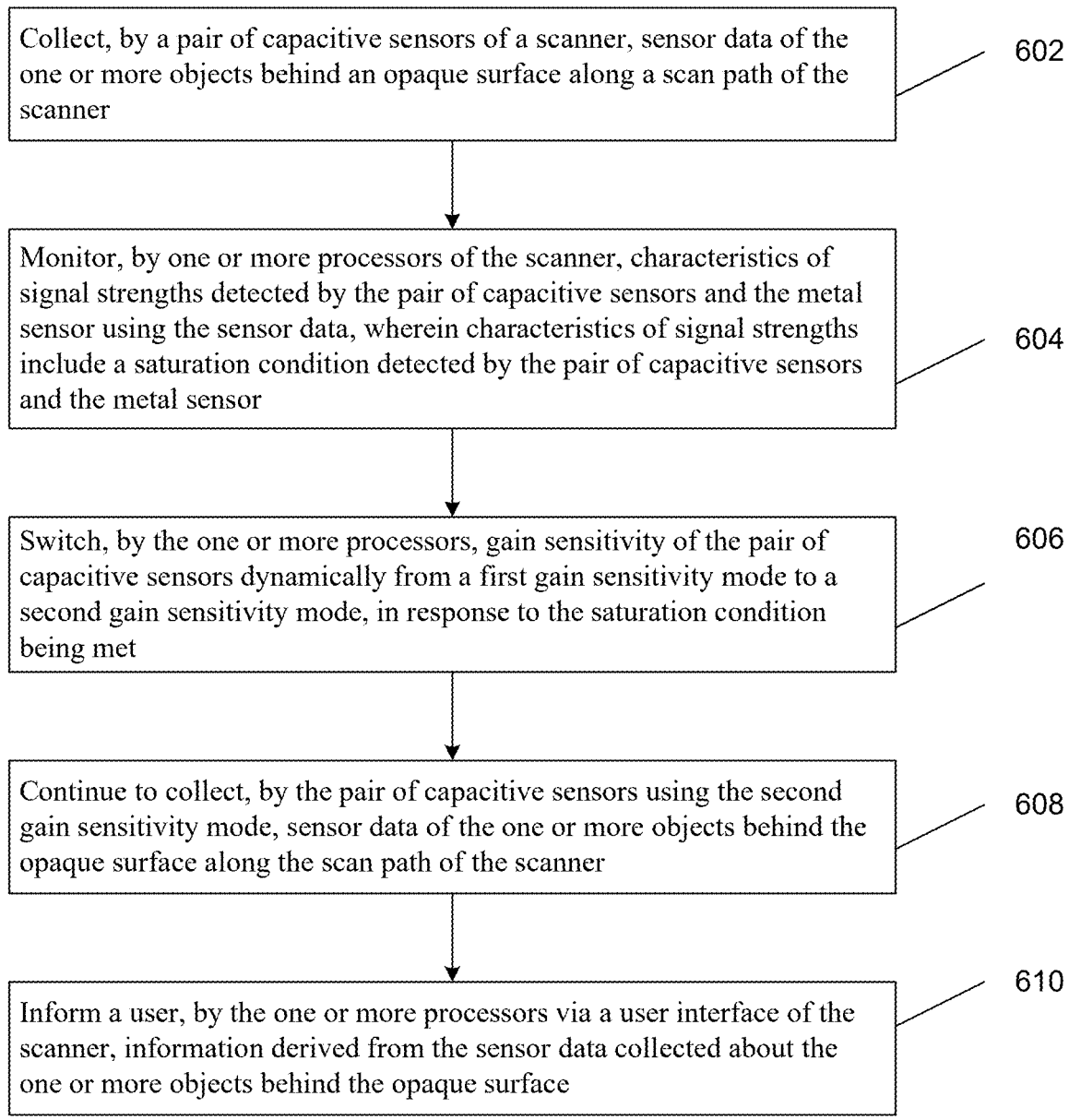
FIG. 6A illustrates a method of detecting objects behind an opaque surface according to aspects of the present invention.

FIG. 6A illustrates a method of detecting objects behind an opaque surface according to aspects of the present invention. As shown in FIG. 6A, in block 602, the method collects, by a pair of capacitive sensors of a scanner, sensor data of the one or more objects behind an opaque surface along a scan path of the scanner. In block 604, the method monitors, by one or more processors of the scanner, characteristics of signal strengths detected by the pair of capacitive sensors and the metal sensor using the sensor data, where characteristics of signal strengths include a saturation condition detected by the pair of capacitive sensors and the metal sensor. In block 606, the method switches, by the one or more processors, gain sensitivity of the pair of capacitive sensors dynamically from a first gain sensitivity mode to a second gain sensitivity mode, in response to the saturation condition being met. In block 608, the method continues to collect, by the pair of capacitive sensors using the second gain sensitivity mode, sensor data of the one or more objects behind the opaque surface along the scan path of the scanner. In block 610, the method informs a user, by the one or more processors via a user interface of the scanner, information derived from the sensor data collected about the one or more objects behind the opaque surface.

According to aspects of the present disclosure, the saturation condition may include signal strength detected by the metal sensor increases, and the signal strength detected by the metal sensor is larger than a predetermined metal gain switch threshold as well as an absolute difference of signal strength detected by a first capacitive sensor and by a second capacitive sensor in the pair of capacitive sensors is larger than a predetermined high absolute difference threshold. The saturation condition may further include signal strength detected by the first capacitive sensor increases and by the second capacitive sensor increases; and signal strength of the first capacitive sensor or the second capacitive sensor is larger than a predetermined high gain sensitivity threshold.

Figure 6B:
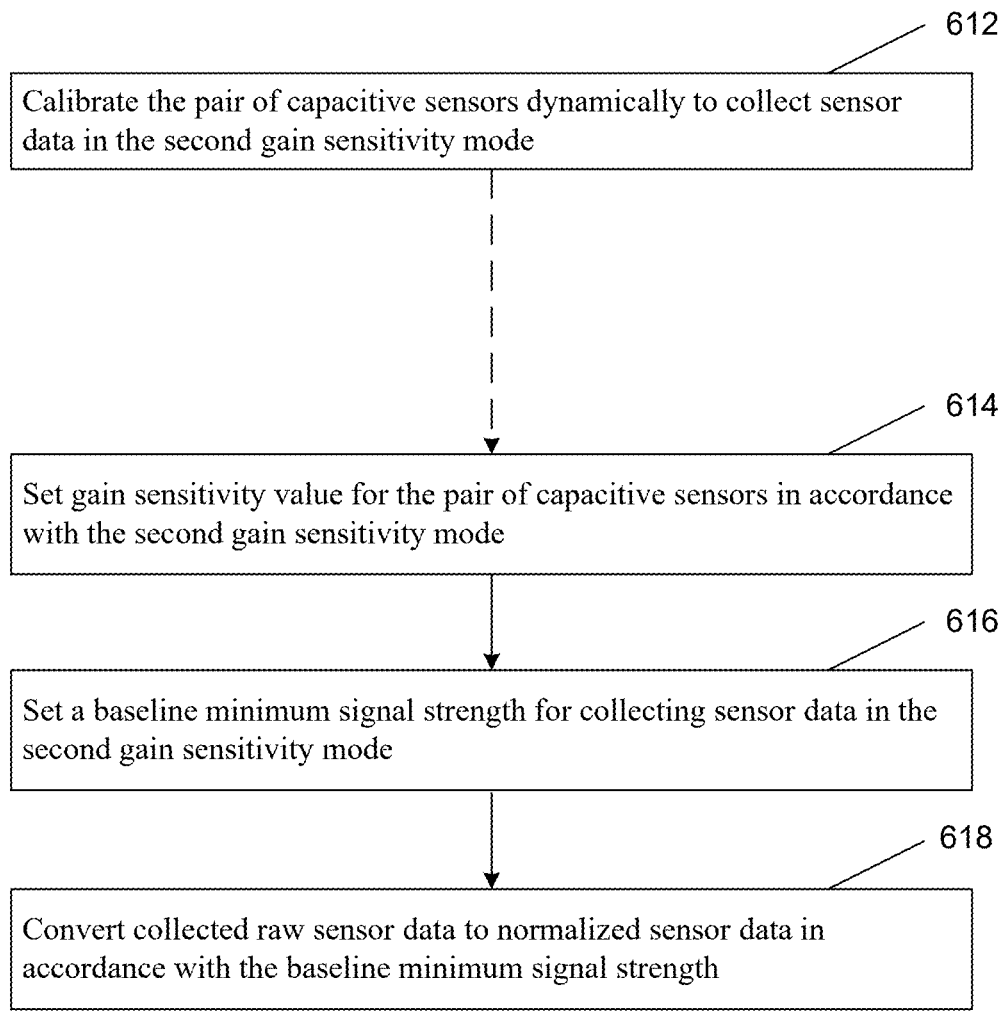
FIG. 6B illustrates an exemplary implementation of switching gain sensitivity of the pair of capacitive sensors from a first gain sensitivity mode to a second gain sensitivity mode of FIG. 4A according to aspects of the present invention.

FIG. 6B illustrates an exemplary implementation of switching gain sensitivity of the pair of capacitive sensors from a first gain sensitivity mode to a second gain sensitivity mode of FIG. 4A according to aspects of the present invention. As shown in FIG. 6B, in block 612, the method calibrates the pair of capacitive sensors dynamically to collect sensor data in the second gain sensitivity mode. According to aspects of the present disclosure, the method of block 612 may additionally or optionally include the methods performed in blocks 614 through 618.

In block 614, the method sets a gain sensitivity value for the pair of capacitive sensors in accordance with the second gain sensitivity mode. In block 616, the method sets a baseline minimum signal strength for collecting sensor data in the second gain sensitivity mode. In block 618, the method converts collected raw sensor data to normalized sensor data in accordance with the baseline minimum signal strength. In some embodiments, the normalized sensor data may be obtained by taking a difference between the raw sensor data and the baseline minimum signal strength.

Figure 6C:
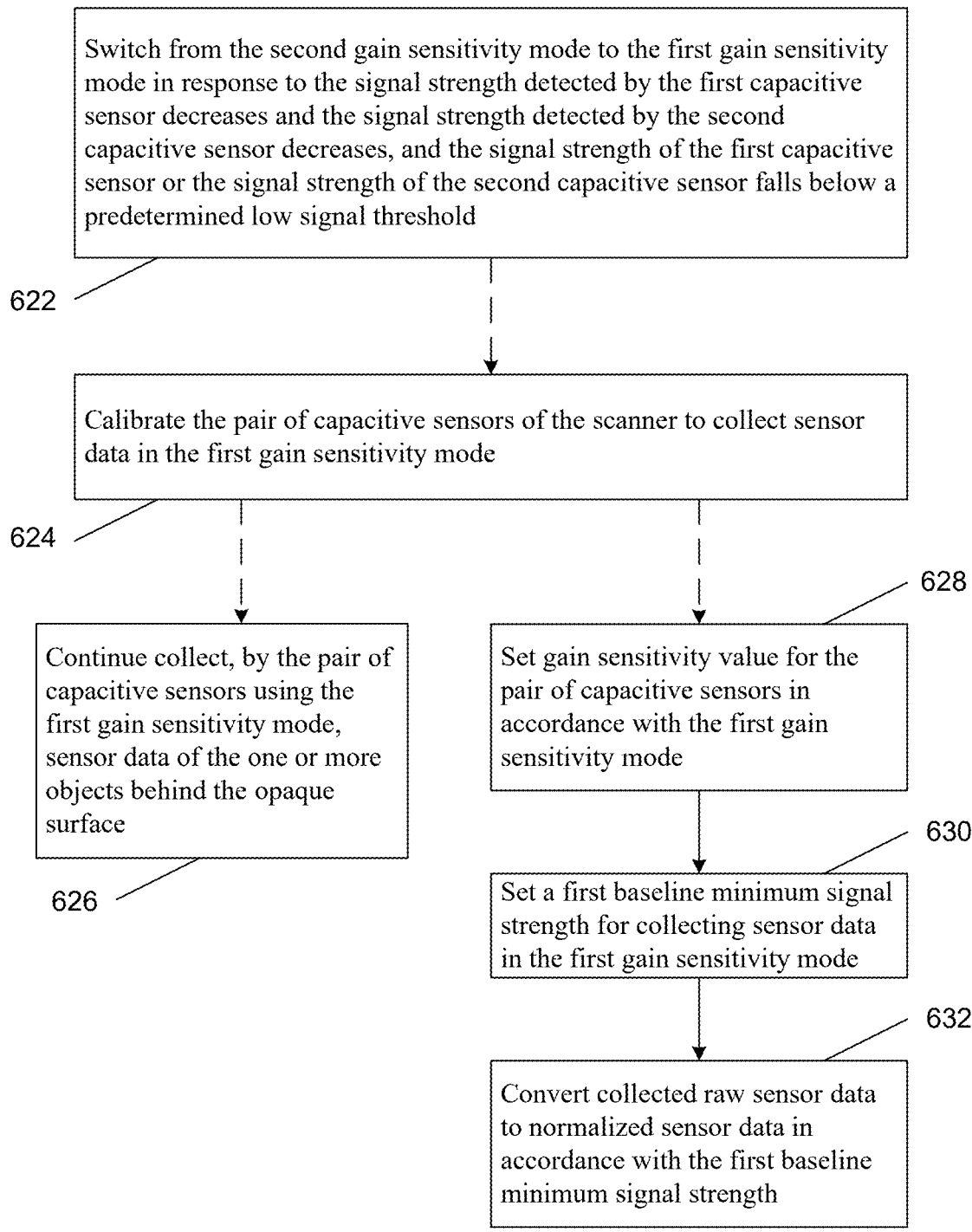
FIG. 6C illustrates an exemplary implementation of switching gain sensitivity of the pair of capacitive sensors from a second gain sensitivity mode back to a first gain sensitivity mode of FIG. 4A according to aspects of the present invention.

FIG. 6C illustrates an exemplary implementation of switching gain sensitivity of the pair of capacitive sensors from a second gain sensitivity mode back to a first gain sensitivity mode of FIG. 4A according to aspects of the present invention. As shown in the example of FIG. 6C, in block 622, the method switches from the second gain sensitivity mode to the first gain sensitivity mode in response to the signal strength detected by the first capacitive sensor decreases and the signal strength detected by the second capacitive sensor decreases, and the signal strength of the first capacitive sensor or the signal strength of the second capacitive sensor falls below a predetermined low signal threshold.

According to aspects of the present disclosure, the method performed in block 622 may additionally or optionally include the methods performed in blocks 624 through 632. In block 624, the method calibrates the pair of capacitive sensors of the scanner to collect sensor data in the first gain sensitivity mode.

According to aspects of the present disclosure, the method performed in block 624 may additionally or optionally include the methods performed in blocks 626 through 632. In block 626, the method continues to collect, by the pair of capacitive sensors using the first gain sensitivity mode, sensor data of the one or more objects behind the opaque surface. In block 628, the method sets gain sensitivity value for the pair of capacitive sensors in accordance with the first gain sensitivity mode. In block 630, the method sets a first baseline minimum signal strength for collecting sensor data in the first gain sensitivity mode. In block 632, the method converts collected raw sensor data to normalized sensor data in accordance with the first baseline minimum signal strength. In some embodiments, the normalized sensor data may be obtained by taking a difference between the raw sensor data and the baseline minimum signal strength.

It will be appreciated that the above descriptions for clarity have described embodiments of the invention with reference to different functional units and controllers. However, it will be apparent that any suitable distribution of functionality between different functional units or processors or controllers may be used without detracting from the invention. For example, functionality illustrated to be performed by separate processor(s) or controller(s) may be performed by the same processor(s) and/or controller(s) included with the unit. In another exemplary embodiment, functionality illustrated to be performed by the processor and/or controller or the display may be performed by an independent and/or remote receiving device that may be able to display the information and/or provide a means accessible to the user. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors, along with the hardware components described above. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors/controllers.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A scanner for dynamic gain switching in detecting one or more objects behind an opaque surface, comprising:
   a pair of capacitive sensors, controlled by one or more processors, configured to collect sensor data of the one or more objects behind an opaque surface along a scan path of the scanner;
   the one or more processors are configured to monitor characteristics of signal strengths detected by the pair of capacitive sensors using the sensor data, wherein the characteristics of signal strengths include a saturation condition detected in a first capacitive sensor or in a second capacitive sensor in the pair of capacitive sensors;
   the one or more processors are further configured to switch gain sensitivity of the pair of capacitive sensors dynamically from a first gain sensitivity mode to a second gain sensitivity mode, in response to the saturation condition being met;
   the pair of sensors are further configured to continue to collect, using the second gain sensitivity mode, sensor data of the one or more objects behind the opaque surface along the scan path of the scanner; and
   the one or more processors are further configured to inform a user, via a user interface of the scanner, information derived from the sensor data collected about the one or more objects behind the opaque surface.

2. The scanner of claim 1, wherein the saturation condition comprises:
   signal strength detected by a metal sensor increases, and the signal strength detected by the metal sensor is larger than a predetermined metal gain switch threshold.

3. The scanner of claim 2, wherein the saturation condition further comprises:
   an absolute difference of signal strength detected by the first capacitive sensor and by the second capacitive sensor in the pair of capacitive sensors is larger than a predetermined high absolute difference threshold.

4. The scanner of claim 1, wherein the saturation condition further comprises:
   signal strength detected by the first capacitive sensor increases and by the second capacitive sensor increases; and
   signal strength of the first capacitive sensor or the second capacitive sensor is larger than a predetermined high gain sensitivity threshold.

5. The scanner of claim 1, wherein the one or more processors are further configured to:

calibrate the pair of capacitive sensors dynamically to collect sensor data in the second gain sensitivity mode.

6. The method of claim 5, wherein the one or more processors are further configured to:
set gain sensitivity value for the pair of capacitive sensors in accordance with the second gain sensitivity mode;
set a baseline minimum signal strength for collecting sensor data in the second gain sensitivity mode; and
convert collected raw sensor data to normalized sensor data in accordance with the baseline minimum signal strength.

7. The scanner of claim 1, wherein the one or more processors are further configured to:
switch from the second gain sensitivity mode to the first gain sensitivity mode in response to the signal strength detected by the first capacitive sensor decreases and the signal strength detected by the second capacitive sensor decreases, and the signal strength of the first capacitive sensor or the signal strength of the second capacitive sensor falls below a predetermined low signal threshold.

8. The scanner of claim 7, wherein the one or more processors are further configured to:
calibrate the pair of capacitive sensors of the scanner to collect sensor data in the first gain sensitivity mode.

9. The scanner of claim 8, wherein the one or more processors are further configured to:
continue to collect, by the pair of capacitive sensors using the first gain sensitivity mode, sensor data of the one or more objects behind the opaque surface.

10. The scanner of claim 8, wherein the one or more processors are further configured to:
set gain sensitivity value for the pair of capacitive sensors in accordance with the first gain sensitivity mode;
set a first baseline minimum signal strength for collecting sensor data in the first gain sensitivity mode; and
convert collected raw sensor data to normalized sensor data in accordance with the first baseline minimum signal strength.

11. A method for dynamic gain switching in detecting one or more objects behind an opaque surface, comprising:
collecting, by a pair of capacitive sensors and a metal sensor of a scanner, sensor data of the one or more objects behind an opaque surface;
monitoring, by one or more processors of the scanner, characteristics of signal strengths detected by the pair of capacitive sensors and the metal sensor using the sensor data, wherein characteristics of signal strengths include a saturation condition detected by the pair of capacitive sensors and the metal sensor;
switching, by the one or more processors, gain sensitivity of the pair of capacitive sensors dynamically from a first gain sensitivity mode to a second gain sensitivity mode, in response to the saturation condition being met;
continue collecting, by the pair of capacitive sensors using the second gain sensitivity mode, sensor data of the one or more objects behind the opaque surface; and
informing a user, by the one or more processors via a user interface of the scanner, information derived from the sensor data collected about the one or more objects behind the opaque surface.

12. The method of claim 11, wherein the saturation condition comprises:
signal strength detected by a metal sensor increases, and the signal strength detected by the metal sensor is larger than a predetermined metal gain switch threshold.

13. The method of claim 12, wherein the saturation condition further comprises:
an absolute difference of signal strength detected by the first capacitive sensor and by the second capacitive sensor in the pair of capacitive sensors is larger than a predetermined high absolute difference threshold.

14. The method of claim 11, wherein the saturation condition further comprises:
signal strength detected by the first capacitive sensor increases and by the second capacitive sensor increases; and
signal strength of the first capacitive sensor or the second capacitive sensor is larger than a predetermined high gain sensitivity threshold.

15. The method of claim 11, wherein switching gain sensitivity of the pair of capacitive sensors from the first gain sensitivity mode to the second gain sensitivity mode further comprises:
calibrating the pair of capacitive sensors dynamically to collect sensor data in the second gain sensitivity mode.

16. The method of claim 15, further comprises:
setting gain sensitivity value for the pair of capacitive sensors in accordance with the second gain sensitivity mode;
setting a baseline minimum signal strength for collecting sensor data in the second gain sensitivity mode; and
converting collected raw sensor data to normalized sensor data in accordance with the baseline minimum signal strength.

17. The method of claim 11, further comprises:
switching from the second gain sensitivity mode to the first gain sensitivity mode in response to the signal strength detected by the first capacitive sensor decreases and the signal strength detected by the second capacitive sensor decreases, and the signal strength of the first capacitive sensor or the signal strength of the second capacitive sensor falls below a predetermined low signal threshold.

18. The method of claim 17, further comprises:
calibrating the pair of capacitive sensors of the scanner to collect sensor data in the first gain sensitivity mode.

19. The method of claim 18, further comprises:
continue collecting, by the pair of capacitive sensors using the first gain sensitivity mode, sensor data of the one or more objects behind the opaque surface.

20. The method of claim 18, further comprises:
setting gain sensitivity value for the pair of capacitive sensors in accordance with the first gain sensitivity mode;
setting a first baseline minimum signal strength for collecting sensor data in the first gain sensitivity mode; and
converting collected raw sensor data to normalized sensor data in accordance with the first baseline minimum signal strength.

* * * * *